Patented July 22, 1947

2,424,512

UNITED STATES PATENT OFFICE 2,424,512

PRODUCTION OF ALKALI METALS AND THEIR OXIDES

Robert A. Stauffer, Cambridge, Mass., assignor to National Research Corporation, Boston, Mass., a corporation of Massachusetts No Drawing. Application August 8, 1944, Serial No. 548,623

13 Claims. (Cl. 75—66)

This invention concerns the production of alkali metals and their oxides, particularly lithium and lithium oxide.

The principal object of the invention is to provide a novel method for obtaining lithium and lithium oxide from the silicate or phosphate ores of lithium, which is simpler to perform and less costly than previously known methods. Another object is to provide such a method which is also applicable to the production of other alkali metals and their oxides from their silicate or phosphate ores.

Heretofore, lithium has been recovered from its ores by successive processes involving chemical and heat treatment of the ore to produce a salt of lithium, usually lithium chloride, and subsequent reduction treatment of the salt, usually by electrolysis. These methods are complex and expensive and the cost of lithium has consequently been high.

I have discovered a method by which lithium can be recovered directly, in a single step, from its silicate or phosphate ores, either uncombined or as the metal oxide, at substantially under the cost of recovery by previously known methods.

In the said method of my invention the silicate or phosphate ore of lithium is mixed with an excess of lime and the mixture is heated to an elevated temperature at which lime reacts with these ores to displace lithium as lithium oxide. I have found that if the reaction is made to take place under a sufficiently high vacuum, the lithium oxide displaced in the reaction will liberate itself from the mix by vaporization and can then be collected by simple condensation. I have further discovered that the metal itself, instead of the oxide, can be directly liberated by vaporization and recovered in the same way by including a suitable reducing agent for lithium oxide in the mix.

The vacuum under which the process is conducted is such that the free air pressure is less than the vapor pressure of lithium or lithium oxide, whichever is sought to be recovered, at the temperature of the reacting mix. The free air pressure should not ordinarily exceed 1 mm. of mercury and the preferred range is from .001 to 0.1 mm. Hg.

The temperature of the mix must exceed the minimum temperature at which the above mentioned displacement reaction of lime with the ore takes place, which is about 900° C. to 950° C. Preferably, the operating temperature is considerably above this minimum both because the displacement reaction proceeds more rapidly and effectively and because the vapor pressure of lithium or lithium oxide increases at higher temperatures, reducing the extent of vacuum which must be maintained for a given rate of vaporization or increasing the rate of vaporization under a given low pressure. I have found operating temperatures of from 150° C. to 250° C. above the above-mentioned minimum temperature to be most effective at the preferred range of pressures previously mentioned.

Suitable reducing agents are those which are active at the operating temperature and which do not form volatile oxides under the operating conditions. Among suitable reducing agents of this character may be mentioned aluminum, aluminum-silicon alloy, silicon and ferro-silicon.

Preferably, the mixture of ore and lime, or of ore, lime and reducing agent, is pelleted before heating. The pellets may, if desired, be heated before charging into the vacuum furnace.

Both the silicate and the phosphate ores of lithium contain potassium and sodium which are liberated from the ore in the process, as a vapor of the metal oxide if the process is being conducted for the recovery of lithium oxide, or as a vapor of the metal itself if the process is being conducted with reducing agent for the recovery of lithium. The potassium or its oxide is liberated at a lower temperature or higher air pressure than the sodium or its oxide which in turn is liberated at a lower temperature or higher pressure than lithium or its oxide. Consequently, as the temperature is raised or the pressure is reduced to the operating range for lithium, the three metals or their oxide vaporize off successively in the order potassium, sodium, lithium. As the three metals or their oxide also condense at different, successively higher temperature in the same order, they are readily separated by successive condensation and removal or by providing three successive sets of condensers in the system respectively cooled to the three different condensing temperatures for the metals or their oxides. Potassium and sodium or their oxide may thus be recovered as useful by-products of the process, reducing the cost of lithium or lithium oxide recovery.

When the process is applied to the recovery of lithium metal from its phosphate ores, that is, when a reducing agent is mixed with the ore and lime of the charge, phosphorus is also liberated from the ore as a vapor. But as the phosphorus vaporizes off before the potassium, sodium and lithium and condenses at a lower temperature, it may readily be separated out by separate condensation.

The following examples illustrate a preferred practice of the process for the recovery of lithium and lithium oxide respectively:

1. A mixture of 55% lime, 40% spodumene (silicate ore of lithium) and 5% powdered aluminum is mixed and pelleted. The pellets are placed in a vacuum furnace. The pressure is reduced to .01 mm. and the temperature is increased to 1100° C. Under these conditions, potassium, sodium and lithium successively distill out in that order, and the different metal vapors are collected separately as liquids in a fractionation tower above the furnace, the potassium condensing at about 200° C., the sodium condensing at about 250° C. and the lithium condensing at about 400° C. After two hours collection, yields are in the vicinity of 90% of the total lithium in the charge. The residue is not fused and may be removed with no difficulty.

If phosphate ore is used in place of the silicate ore, phosphorus distills out before the alkali metals and is condensed in the fractionation tower at a temperature of about 150° C.

2. A mixture of 25% powdered amblygonite (phosphate ore of lithium) and 75% lime is pelleted and the pellets are placed in a vacuum furnace equipped with a cooled sleeve for condensing the product. The temperature is raised to 1150° C. and the pressure reduced to .01 mm., under which conditions potassium oxide, sodium oxide and lithium oxide successively distill off in that order and are separately condensed as needles in a fractionation tower above the furnace at condensing temperatures of about 450° C., 500° C. and 800° C., respectively. The spent pellets maintain their shape and do not fuse so that they may be easily removed. In two hours, approximately 90% of the lithium in the ore is recovered as $Li_2O$. This may be used as such or heated with a reducing agent to yield lithium.

Silicate ore may be substituted for the phosphate ore with like results.

The process may also be advantageously employed for the recovery of the alkali metals cesium and rubidium, or the oxide of either metal, from their silicate or phosphate ores. A mixture of the ore with an excess of lime, preferably pelleted, is heated in vacuum to a temperature above the minimum temperature at which the lime is reactive with the ore to displace oxide of the metal therefrom, preferably above 900° C. for cesium and above 950° C. for rubidium. If recovery of the metal uncombined with oxygen is sought, a suitable reducing agent for the metal oxide is included in the lime and ore mixture. The reducing agents previously mentioned are suitable, as are also iron and calcium carbide. The free air pressure of the vacuum is maintained below 1 mm. Hg and below the vapor pressure, at the operating temperature, of the metal or metal oxide, whichever is to be recovered. The preferred pressure range is the same as for lithium recovery. The metal or metal oxide vaporizes and is recovered by condensation as in the case of lithium.

I claim:

1. A process for recovering one of the substances of the group consisting of the alkali metals lithium, rubidium and cesium and their oxides by direct distillation from their silicate and phosphate ores which includes the step of reacting a mixture of one of said ores of a said metal and an amount of lime in excess of said ore at an elevated temperature in excess of about 900° C. to displace oxide of said alkali metal from said ore while exposing the reacting mixture to a vacuum of a free air pressure below 1 mm. Hg and below the vapor pressure, at said temperature, of the metallic substance to be recovered.

2. A process as claimed in claim 1 wherein the free air pressure of said vacuum is between .001 and 0.1 mm. Hg.

3. A process as claimed in claim 1 wherein the mixture of ore and lime is pelleted prior to said heating step.

4. A process for recovering one of the alkali metals lithium, rubidium and cesium from their silicate and phosphate ores which includes the steps of heating a mixture of one of said ores of a said metal, an amount of lime in excess of said ore, and a reducing agent for oxide of said metal to an elevated temperature in excess of about 900° C. at which the lime reacts with the ore to displace oxide of said metal therefrom and said reducing agent reacts with said oxide to displace said metal therefrom, exposing the heated, reacting mixture to a vacuum of a free air pressure below 1 mm. Hg and below the vapor pressure of said metal at said temperature thereby vausing said displaced metal to vaporize, and collecting said metal by condensation of its said vapor.

5. A process as claimed in claim 4 wherein the free air pressure of said vacuum is between .001 and 0.1 mm. Hg.

6. A process as claimed in claim 4 wherein the mixture of ore, lime and reducing agent is pelleted prior to said heating step.

7. A process for the recovery of lithium from its silicate and phosphate ores which includes the steps of subjecting a mixture of one of said ores, an amount of lime in excess of said ore and a reducing agent for lithium oxide, heated to an elevated temperature above 900° C., to a vacuum of a free air pressure below 1 mm. Hg and below the vapor pressure of lithium at said elevated temperature, thereby causing liberation of lithium vapor from said ore, and collecting the lithium by condensation of said vapor.

8. A process as claimed in claim 7 wherein the free air pressure of said vacuum is between .001 and 0.1 mm. Hg.

9. A process as claimed in claim 7 wherein the elevated temperature is about 1100° C. and the free air pressure of the vacuum is about .01 mm. Hg.

10. A process as claimed in claim 7 wherein the mixture of ore, lime and reducing agent is pelleted.

11. A process as claimed in claim 7 wherein the reducing agent is one of the group consisting of aluminum, aluminum-silicon alloy, silicon and ferro-silicon.

12. A process for the recovery of lithium oxide from the silicate and phosphate ores of lithium which includes the steps of subjecting a mixture of one of said ores and an amount of lime in excess of said ore, heated to an elevated temperature above 900° C., to a vacuum of a free air pressure below 1 mm. Hg and below the vapor pressure of lithium oxide at said elevated temperature, thereby causing liberation of lithium oxide vapor from said ore, and collecting the lithium oxide by condensation of said vapor.

13. A process as claimed in claim 12 wherein the elevated temperature is about 1150° C. and the free air pressure is about .01 mm. Hg.

ROBERT A. STAUFFER.

REFERENCES CITED

The following references are of record in the file of this patent:

UNITED STATES PATENTS

| Number | Name | Date |
|---|---|---|
| 1,265,360 | Morrison | May 7, 1918 |
| 2,028,390 | Hanson | Jan. 21, 1936 |

OTHER REFERENCES

O. S. R. D. Report No. 2089; PB 22481. On Lithium Research by National Research Corp. of Boston, dated March 15, 1943, to October 18, 1943.

O. S. R. D. Report No. 3758; PB 22472. On Lithium Research by National Research Corp. of Boston, dated June 1944.

Certificate of Correction

Patent No. 2,424,512.                                                                                                                   July 22, 1947.

ROBERT A. STAUFFER

It is hereby certified that error appears in the printed specification of the above numbered patent requiring correction as follows: Column 4, line 38, claim 4, for "vausing" read *causing*; and that the said Letters Patent should be read with this correction therein that the same may conform to the record of the case in the Patent Office.

Signed and sealed this 2nd day of September, A. D. 1947.

[SEAL]

LESLIE FRAZER,
*First Assistant Commissioner of Patents.*